United States Patent
Joyce et al.

(10) Patent No.: US 8,433,930 B1
(45) Date of Patent: Apr. 30, 2013

(54) ONE-TIME PROGRAMMABLE MEMORIES FOR KEY STORAGE

(75) Inventors: Juju Joyce, Milpitas, CA (US); Martin Langhammer, Wiltshire (GB); Keone Streicher, San Ramon, CA (US); David Jefferson, Morgan Hill, CA (US)

(73) Assignee: Altera Corporation, San Jose, CA (US)

( * ) Notice: Subject to any disclaimer, the term of this patent is extended or adjusted under 35 U.S.C. 154(b) by 49 days.

(21) Appl. No.: 12/884,753

(22) Filed: Sep. 17, 2010

Related U.S. Application Data (62) Division of application No. 11/042,937, filed on Jan. 25, 2005, now Pat. No. 7,818,584.

(51) Int. Cl.
H04L 29/06 (2006.01)

(52) U.S. Cl.
USPC .......................................... 713/193

(58) Field of Classification Search ................... 719/173; 713/193
See application file for complete search history.

(56) References Cited

U.S. PATENT DOCUMENTS

| | | | |
|---|---|---|---|
| 4,598,170 A | 7/1986 | Piosenka et al. |
| 4,812,675 A | 3/1989 | Goetting |
| 5,010,331 A | 4/1991 | Dias et al. |
| 5,039,394 A | 8/1991 | Chen et al. |
| 5,452,355 A | 9/1995 | Coli |
| 5,457,408 A | 10/1995 | Leung |
| 6,191,614 B1 | 2/2001 | Schultz et al. |
| 6,212,639 B1 | 4/2001 | Erickson et al. |
| 6,996,713 B1 | 2/2006 | Trimberger |
| 7,028,191 B2 | 4/2006 | Michener et al. |
| 7,197,647 B1 * | 3/2007 | Van Essen et al. ............ 713/189 |
| 7,200,235 B1 | 4/2007 | Trimberger |
| 7,278,128 B1 | 10/2007 | Trimberger |
| 7,299,203 B1 | 11/2007 | Nelson |
| 7,325,141 B2 | 1/2008 | Chow et al. |
| 7,373,668 B1 | 5/2008 | Trimberger |
| 7,442,583 B2 | 10/2008 | Bonaccio et al. |
| 7,479,798 B1 | 1/2009 | Reese |
| 7,606,362 B1 | 10/2009 | Streicher et al. |
| 7,734,043 B1 | 6/2010 | Jefferson et al. |
| 7,818,584 B1 | 10/2010 | Joyce et al. |
| 2002/0114455 A1 | 8/2002 | Asahi et al. |

(Continued)

OTHER PUBLICATIONS

Hoflich, Wolfgang; "Using the XC4000 Readback Capability", Xilinx XAPP 015.000, http://www.xilinx.com/support/documentation/application_notes/xapp015, pp. 8 pgs., downloaded on Dec. 15, 2010.

(Continued)

Primary Examiner — Jason Gee
(74) Attorney, Agent, or Firm — Ropes & Gray LLP (57) ABSTRACT

Circuits, methods, and apparatus that store and prevent modification or erasure of stored encoding keys, serial identification numbers, or other information. An encoding key stored with an embodiment of the present invention may be used to decode a configuration bitstream on an integrated circuit, such as an FPGA. A serial number may be used to track or authenticate an integrated circuit. Embodiments of the present invention store this information in a memory such as an SRAM, DRAM, EPROM, EEPROM, flash, fuse array, or other type of memory. In order to prevent its erasure or modification, write enable circuitry for the memory is then permanently disabled, and if the memory is volatile, a continuous power supply is provided. Further refinements verify that the write enable circuitry has been disabled before allowing the device to be configured or to be operable.

20 Claims, 8 Drawing Sheets

U.S. PATENT DOCUMENTS

| | | | |
|---|---|---|---|
| 2002/0145931 A1* | 10/2002 | Pitts | 365/225.7 |
| 2002/0199110 A1 | 12/2002 | Kean | |
| 2003/0020512 A1 | 1/2003 | Mantey | |
| 2004/0186991 A1 | 9/2004 | Kobayashi et al. | |
| 2005/0113070 A1 | 5/2005 | Okabe | |
| 2005/0289355 A1 | 12/2005 | Kitariev et al. | |
| 2006/0117122 A1 | 6/2006 | Hannah | |
| 2007/0288765 A1 | 12/2007 | Kean | |

OTHER PUBLICATIONS

Office Actions from U.S. Appl. No. 11/435,416.

Office Action from U.S. Appl. No. 11/042,032.

Office Actions from U.S. Appl. No. 11/042,937.

Office Actions from U.S. Appl. No. 11/042,019.

Office Actions from U.S. Appl. No. 12/332,789.

Office Action from U.S. Appl. No. 12/559,287.

Office Actions and/or Replies from U.S. Appl. No. 12/332,789, filed Dec. 11, 2008.

Office Actions and/or Replies from U.S. Appl. No. 12/559,287, filed Sep. 14, 2009.

* cited by examiner

ONE-TIME PROGRAMMABLE MEMORIES FOR KEY STORAGE

CROSS-REFERENCE TO RELATED APPLICATIONS

This application is a division of prior U.S. patent application Ser. No. 11/042,937, filed Jan. 25, 2005. The prior application is hereby incorporated by reference herein in its entirety.

BACKGROUND

The present invention relates to configuring field programmable gate arrays generally, and more particularly to protecting configuration bitstreams from detection or alteration.

Field programmable gate array devices are logic or mixed signal devices that may be configured to provide a desirable user-defined function. FPGAs are typically configured using data received from a configuration device. This configuration data may be referred to as a configuration bitstream or program object file (POF). This bitstream opens and closes switches formed on an FPGA such that desired electrical connections are made.

Modern FPGAs contain hundreds of thousands of logic gates, as well as processors, memories, dedicated analog function blocks, and other circuits. This large amount requires a similarly large configuration bitstream to configure it. For example, 55 Megabits of configuration data are now needed by some FPGAs.

This configuration data represents an FPGA user design that is the outcome of a huge investment in manpower and research and development costs, often in the million dollar range. To protect this investment, configuration bitstreams are often encrypted. The encrypted bitstream is decrypted using a key stored on the FPGA, and the FPGA is then configured. When the FPGA is configured by a configuration device, the bitstream that is susceptible to detection is encrypted and thus protected.

Unfortunately, problems remain even with encryption. For example, if the key can be erased or modified, then the protected device can be reconfigured to perform a new function. This can be particularly problematic if the device is performing an important function, such as network security. Similar problems remain if other types of encoding are used.

Thus, what is needed are circuits, methods, and apparatus for storing encoding keys in such a way that they cannot be modified or erased. In this way, the unauthorized reconfiguration of FPGAs can be prevented.

SUMMARY

Accordingly, embodiments of the present invention provide circuits, methods, and apparatus that store and prevent modification or erasure of stored encoding keys, serial identification numbers, or other information. An encoding key stored with an embodiment of the present invention may be used to decode a configuration bitstream on an FPGA or other programmable or configurable device, or it may be used on any device where preventing modification or erasure of information is desirable. A serial identification number stored with an embodiment of the present invention may be used to authenticate or track the origin of an integrated circuit.

An exemplary embodiment of the present invention stores a key in a fuse array. Fuses in the array are left intact or blown depending on the polarity of bits in the key to be stored. The circuit path used to blow the fuses can then be permanently disabled to prevent additional fuses from being blown at a later time in an effort to modify the key.

Another exemplary embodiment of the present invention stores a key in a memory array on an FPGA or other integrated circuit. The memory may be an SRAM, DRAM, EPROM, EEPROM, flash, or other type of memory. The memory may be volatile or non-volatile. If a volatile memory is used, a constant power supply is used to prevent erasure of information in the memory. Storing is done by providing the key to the memory and asserting a write enable signal. In order to prevent the stored key's erasure or modification, the write enable signal or generating circuit is then permanently disabled. Further refinements include circuitry that verifies that the write enable signal or circuit has been disabled before allowing the device to function. Various embodiments of the present invention may incorporate one or more of these and the other features described herein.

A better understanding of the nature and advantages of the present invention may be gained with reference to the following detailed description and the accompanying drawings.

BRIEF DESCRIPTION OF THE DRAWINGS

FIG. 6A is a simplified schematic of a fuse array that may be used as the memory in FIG. 5, or as a memory in other embodiments of the present invention, while

DESCRIPTION OF EXEMPLARY EMBODIMENTS

Figure 1:
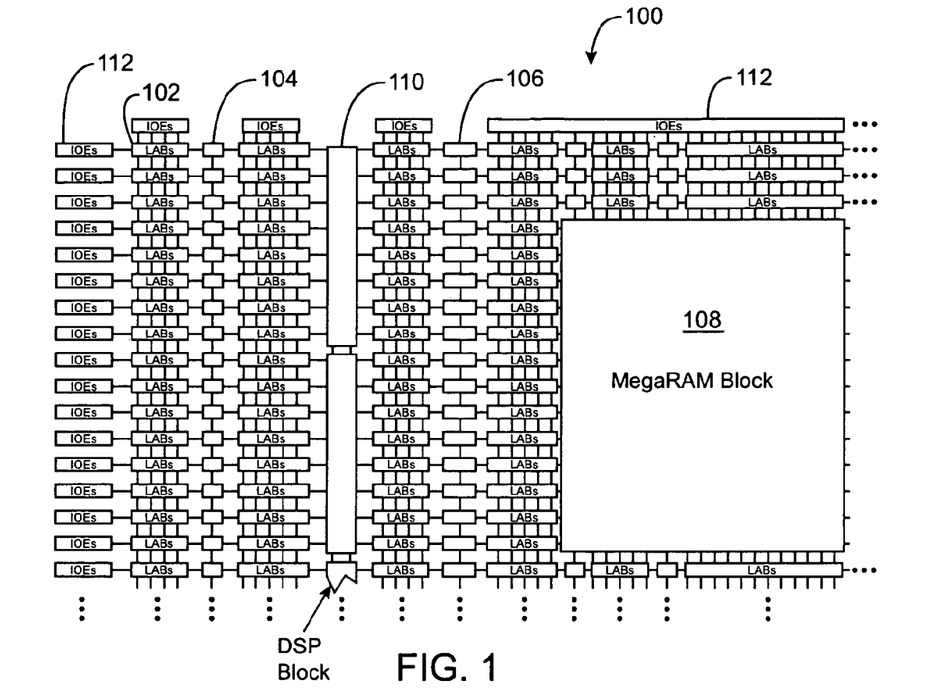
FIG. 1 is a simplified block diagram of a programmable logic device that may benefit by incorporating embodiments of the present invention.

FIG. 1 is a simplified partial block diagram of an exemplary high-density programmable logic device 100 wherein techniques according to the present invention can be utilized. PLD 100 includes a two-dimensional array of programmable logic array blocks (or LABs) 102 that are interconnected by a network of column and row interconnections of varying length and speed. LABs 102 include multiple (e.g., 10) logic elements (or LEs), an LE being a small unit of logic that provides for efficient implementation of user defined logic functions.

PLD 100 also includes a distributed memory structure including RAM blocks of varying sizes provided throughout the array. The RAM blocks include, for example, 512 bit blocks 104, 4K blocks 106 and an M-Block 108 providing 512K bits of RAM. These memory blocks may also include shift registers and FIFO buffers. PLD 100 further includes digital signal processing (DSP) blocks 110 that can implement, for example, multipliers with add or subtract features.

It is to be understood that PLD 100 is described herein for illustrative purposes only and that the present invention can be implemented in many different types of PLDs, FPGAs, and the other types of digital integrated circuits.

Figure 2:
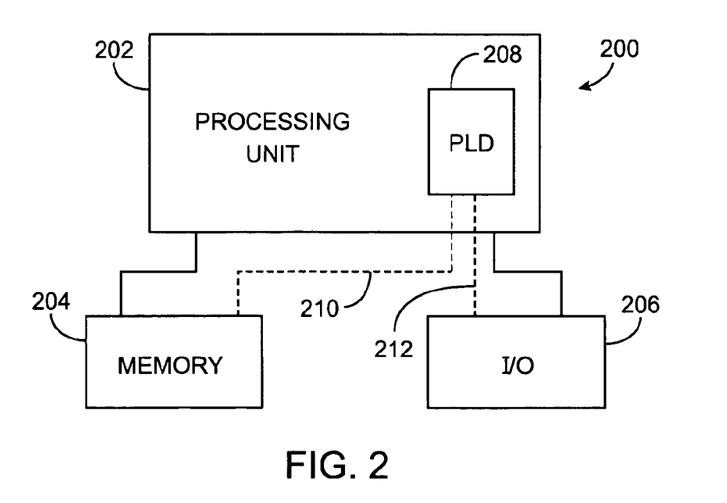
FIG. 2 is a block diagram of an electronic system that may benefit by the incorporating embodiments of the present invention.

While PLDs of the type shown in FIG. 1 provide many of the resources required to implement system level solutions, the present invention can also benefit systems wherein a PLD is one of several components. FIG. 2 shows a block diagram of an exemplary digital system 200, within which the present invention may be embodied. System 200 can be a programmed digital computer system, digital signal processing system, specialized digital switching network, or other processing system. Moreover, such systems may be designed for a wide variety of applications such as telecommunications systems, automotive systems, control systems, consumer electronics, personal computers, Internet communications and networking, and others. Further, system 200 may be provided on a single board, on multiple boards, or within multiple enclosures.

System 200 includes a processing unit 202, a memory unit 204 and an I/O unit 206 interconnected together by one or more buses. According to this exemplary embodiment, a programmable logic device (PLD) 208 is embedded in processing unit 202. PLD 208 may serve many different purposes within the system in FIG. 2. PLD 208 can, for example, be a logical building block of processing unit 202, supporting its internal and external operations. PLD 208 is programmed to implement the logical functions necessary to carry on its particular role in system operation. PLD 208 may be specially coupled to memory 204 through connection 210 and to I/O unit 206 through connection 212.

Processing unit 202 may direct data to an appropriate system component for processing or storage, execute a program stored in memory 204 or receive and transmit data via I/O unit 206, or other similar function. Processing unit 202 can be a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU.

For example, instead of a CPU, one or more PLD 208 can control the logical operations of the system. In an embodiment, PLD 208 acts as a reconfigurable processor, which can be reprogrammed as needed to handle a particular computing task. Alternately, programmable logic device 208 may itself include an embedded microprocessor. Memory unit 204 may be a random access memory (RAM), read only memory (ROM), fixed or flexible disk media, PC Card flash disk memory, tape, or any other storage means, or any combination of these storage means.

Figure 3A:
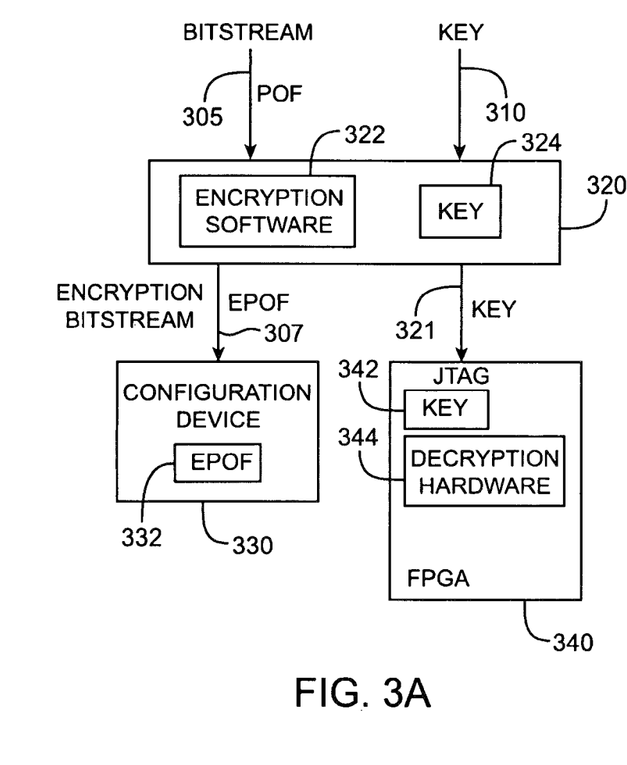
FIGS. 3A and 3B illustrate circuits and software that may benefit by incorporating embodiments of the present invention.
Figure 3B:
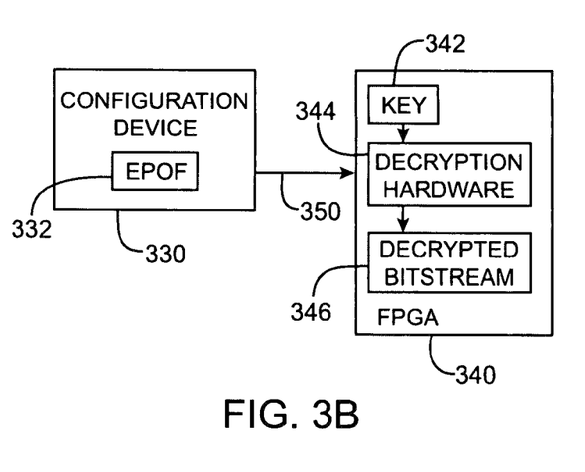

FIGS. 3A and 3B illustrate circuits and software that may be improved by incorporating embodiments of the present invention. These circuits and software may be used to provide encrypted configuration information to field programmable gate arrays. Specifically, FIG. 3A illustrates the loading of an encrypted bitstream into a configuration device and a key into a field programmable gate array, while FIG. 3B illustrates the loading of the encrypted bitstream from the configuration device to the FPGA.

FIG. 3A includes a software package 320 that further includes encryption software 322 and key storage and handling software 324, a configuration device for storing an encrypted bitstream 332, and a field programmable gate array including storage locations for key storage 342 and decryption hardware 344. A bitstream is loaded into the encryption software routine 322 via software interface 305. The encryption software encrypts the bitstream and provides an encrypted bitstream through interface 307 to the configuration device 330, where it is stored as an encrypted bitstream 332. Similarly, a key is provided by a user over interface 310 to key handling software 324 which provides the key over interface 321 to the FPGA 340. The key is stored in locations 342 for use by the decryption hardware 344.

FIG. 3B includes a configuration device that further includes encrypted bitstream 332, and a field program gate array 340 including key storage 342 decryption hardware 344 and a decrypted bitstream 346. At power up, during a fault condition, or other appropriate time, the encrypted bitstream 332 is provided by the configuration device 330 over interface 350 to the decryption hardware 344 in the field programmable gate array 340. The decryption hardware 344 also receives the key 342 stored on the field programmable gate array 340 and provides a decrypted bitstream 346. The decrypted bitstream 346 is then used to configure the FPGA such that it provides the desired logic function.

In typical applications, the activities illustrated in FIG. 3A occur either at a location (for example, their factory) under control of the field programmable gate array manufacturer (vendor) or purchaser, while the activities illustrated in FIG. 3B occur once the field programmable gate array is incorporated in an end product. Accordingly, since only the encrypted bitstream is available for detection over interface 350 in FIG. 3B, the original un-encrypted bitstream is protected from discovery.

Figure 4:
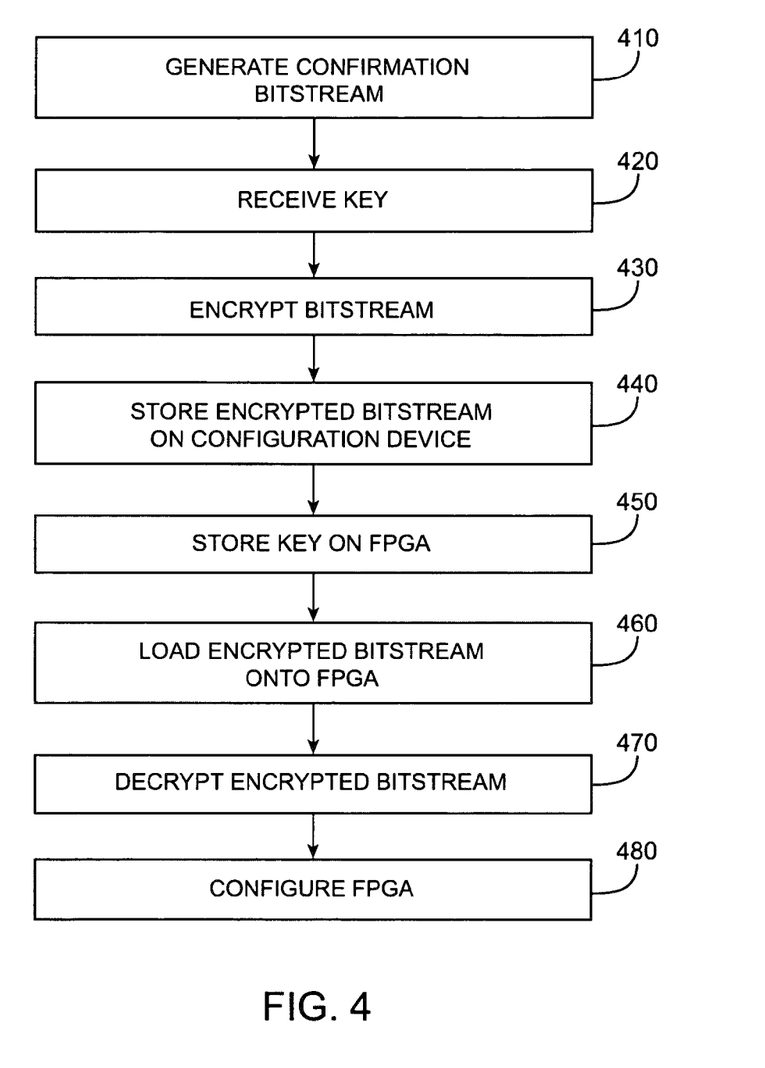
FIG. 4 illustrates a method of configuring a field programmable gate array that may be improved by incorporating embodiments of the present invention.

FIG. 4 illustrates a method of configuring a field programmable gate array that may be improved by incorporating embodiments of the present invention. In act 410, a configuration bitstream is generated. The configuration bitstream may be generated using design software such as VHDL (Very High Speed Integrated Circuit Hardware Description Language) or Verilog. In act 420, an encryption key is received, for example from a user, database, look-up table or other source. Alternately, the software program may generate its own key, or suggest a key to the user. In act 430, the key is used to encrypt the configuration bitstream, and in act 440, the encrypted bitstream is stored on a configuration device. This configuration device may be a flash memory or other non-volatile memory device, such as a memory with a self-contained battery backup. The configuration device may be an integrated circuit, compact flash card, or other device. In act 450, the key is stored on a field programmable gate array or other programmable or configurable device. The acts to this point are typically performed at a location under the control of the field programmable gate array vendor or purchaser such as an original equipment manufacturer (OEM).

The following acts typically occur at power up, after a fault or error condition, or at other appropriate times while the FPGA is in use in an electrical system. In act 460, the encrypted bitstream is loaded from the configuration device to the field programmable gate array. In act 470, the encrypted bitstream is decrypted in the FPGA and used to configure the FPGA in act 480. This configuration act configures the FPGA such that it performs the desired function.

Figure 5:
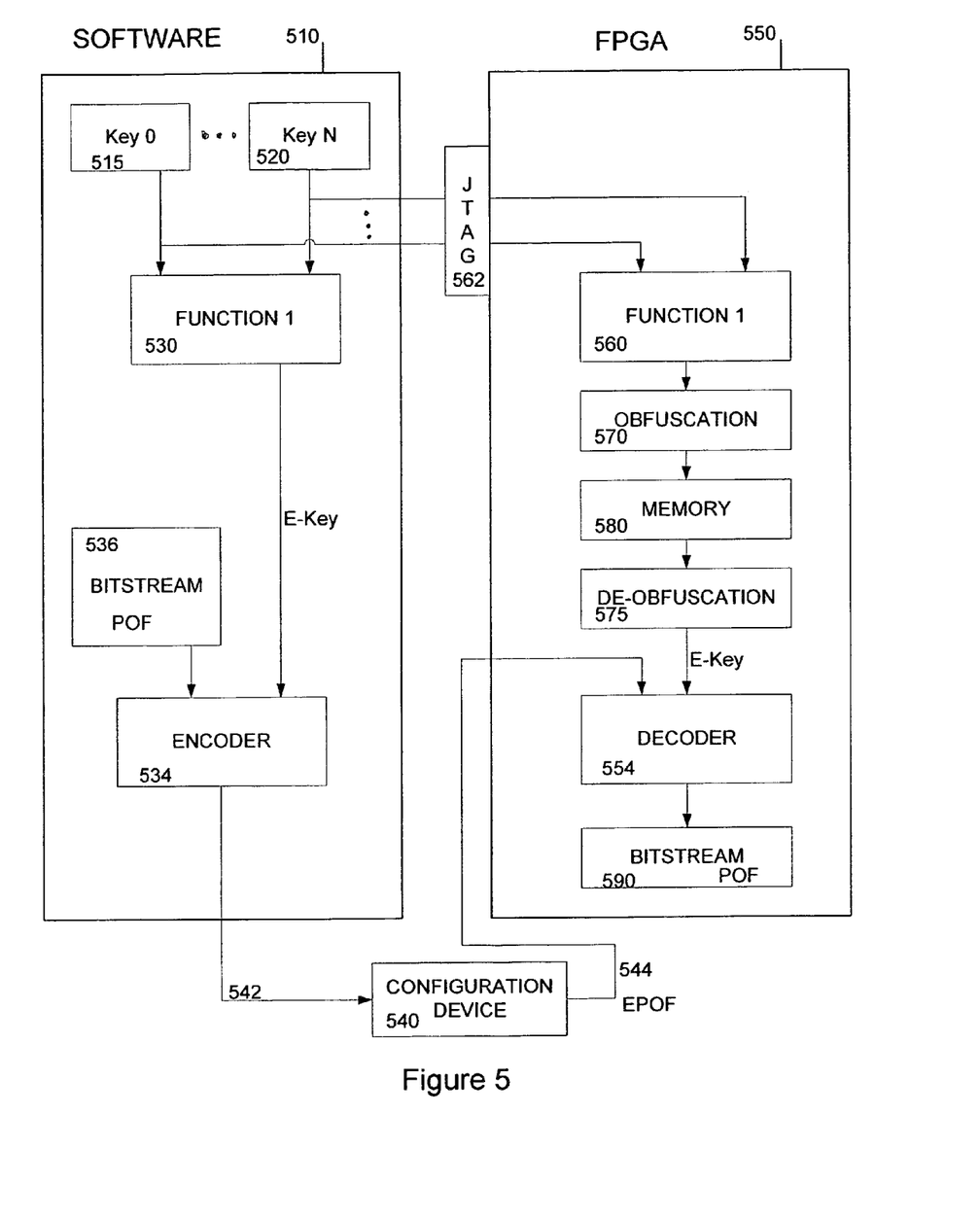
FIG. 5 illustrates circuits and software for protecting a configuration bitstream, where an encoding key is stored in a memory array according to an embodiment of the present invention.

FIG. 5 illustrates circuits and software for protecting a configuration bitstream, where an encoding key is stored in a memory array according to an embodiment of the present invention. This figure includes a software program or module 510, configuration device 540, and field programmable gate array 550. This figure, as with the other included figures, is shown for illustrative purposes and does not limit either the possible embodiments of the present invention or the claims.

Software module 510 receives one or more keys, Key 0 515 through Key N 520, from a user, other software program or module, or other appropriate source. For example, one or more of these keys may be provided by the software program 510. Quartus, available from Altera Corporation in San Jose, Calif. is an example of a program that may be used as program 510. Alternately, these keys may be provided by a user, they may be provided or suggested by software, found in a look-up table or other source, or provided in some other manner. The number of keys actually used may be one, two, or more than two.

These keys are received by software module Function 1 530, which performs a first function on the keys to generate an output. As with the other function blocks in this and the other figures, this function may include encryption, scrambling, exclusive-ORing, the reverse of these functions, or combination of any of these or other functions. For example, one key may be encoded by a second key. This encoding may be consistent with the data encryption standard (DES), triple data encryption standard (3DES), or the advance encryption standard (AES) software module. The output of the function block 530 and the configuration bitstream or program object file 536 are received by a second software module, the encoder 534. This second software module may perform the same function as the first software module Function 1 530, or it may perform a different function. The output of the second software module, encoder 534, provides a masked or encoded configuration bitstream. This encoded bitstream (or encoded program object file, E-POF) is then provided on bus 542 to the configuration device 540. Typically, the configuration device 540 is sold with one or more field programmable gate arrays 550 and they are all then incorporated into an end product. In various embodiments, the configuration device is incorporated as part of the FPGA 550.

The keys, Key 0 515 through Key N 520, are also provided to FPGA 550, for example through a JTAG (Joint Test Action Group, IEEE standard 1149.1) or other appropriate interface 562. The FPGA may be an FPGA manufactured by Altera Corporation. The FPGA 550 incorporates a first function block, Function 1 560, which receives the keys Key 0 515 through Key N 520. The first function block, Function 1 560, performs a function on them to generate an encoded key, E-Key. This function may mirror the function performed by the first software module Function 1 530. Again, this function may include encryption, exclusive ORing, scrambling, or other function or combination of these or other functions. The encoded key, E-Key, is then received by an obfuscation circuit 570. The obfuscation circuit 570 acts to disguise the encoded E-Key. The disguised encoded key is stored in a memory array 580. In this way, even if the contents of the memory array 580 are discovered, the encoded E-Key is protected.

In typical applications, the configuration bitstream is encoded and stored in a configuration device, and the encoded E-Key is stored in the memory array 580 in the device manufacturer or customer's factory. Once the device is in an end product and is being configured, the following activities occur.

The output of the memory array 580 is received by reverse or de-obfuscation circuit 575 which reconstructs the original encoded key, E-Key. A second function block, the decoder 554, receives the encoded key, E-Key, and the encoded bitstream from the configuration device 540, and provides a decoded configuration bitstream 590 to the FPGA 550. This second function block, the decoder 554, may mirror the function performed by the second software module 534. Again, this function may include encryption (specifically decryption), exclusive-ORing, scrambling (descrambling), or other function or combination of these or other functions. The FPGA is then configured using the decoded configuration bitstream 590.

It should be noted that multiple, separate function circuits are shown. In this example, a first function block, Function 1 560, and second function block, the decoder 554, are shown. In typical embodiments, these are one function block circuit that is reused multiple times. For example, multiplexers at the circuit input and output may be used to direct data to and from the function block at different points in the circuit's operation. Further, the direction of signal flow in some internal circuits may be reversed. In a typical embodiment, this circuit is a dedicated, hardwired circuit, since the encoded configuration bitstream is not available to configure it. In other embodiments, the circuitry may be configurable and configured by bits that are either included in a portion of the bitstream that is not encoded, hardwired into the integrated circuit, or provided in some other appropriate manner. Similar concepts apply to the software program modules included in these figures.

Again, the function blocks may provide or include an encryption function (or its reverse, decryption). This encryption function may be stand-alone or part of a larger function. The encryption may be AES, though other encryption circuits may be used, for example 3DES, or simply DES circuits, or other proprietary encryption algorithms may be used. Also, unconventional numbers of rounds of encryption may be used. For example, instead of a conventional 10 rounds of AES encoding, 5, 15, or other numbers of rounds may be used. In the future there will be other encryption schemes that will certainly be developed and may alternately be used. In a specific embodiment of the present invention, one or more keys having a length of 128 bits are used, though other lengths, such as 192 and 265 bits, may be used. Also, each device may have an individual key, each design may have a common key, each customer may have a key, or other arrangements may be made.

In this and the other included figures, the bitstream is encoded then decoded. In some applications, less than the entire bitstream is encoded. For example, there may be header information or the like which is common to all devices and may be generally known. If this information is encrypted, the key could be determined. Accordingly, this information is typically not encoded in embodiments of the present invention.

According to various embodiments of the present invention, erasure or modification of a key or other stored information is prevented by storing the information in a non-volatile one-time programmable memory, and then disabling the memory's write enable circuit. In a specific embodiment, the one-time programmable memory includes a number of one-time programmable fuses. These fuses are typically polysilicon fuses that are either blown or left as a connection. Alternately, as mentioned above, other non-volatile memory, like Flash, may be used to store a key, serial identification number, or other information. Unlike the fuses in a fuse array, memory cells in a Flash or similar memory are reprogrammable. Once a key is stored in a non-volatile reprogrammable memory, key modification or erasure can be prevented by permanently disabling any means of writing or erasing (i.e., write enable) data stored in the memory. Volatile reprogrammable memory, like SRAM or DRAM, may alternately be used to store the key. Once the key is stored in a volatile memory, key modification is again prevented by permanently disabling any means of writing or erasing data. However, information stored in volatile memories is erased when their power supply is interrupted. Thus, embodiments of the present invention that use a volatile memory need a constant power supply in order to prevent erasure.

Using this type of memory prevents erasure and modification of the contents of the memory 580, thus helping to prevent that the device from being reconfigured to perform a different function than what was intended.

Figure 6A:
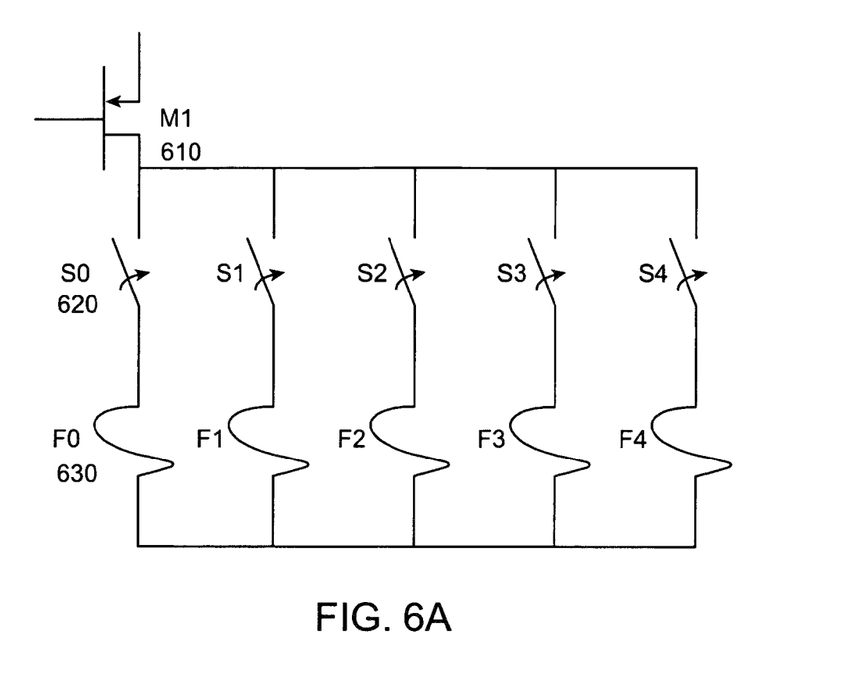

FIG. 6A is a simplified schematic of a fuse array that may be used as the memory in FIG. 5, or as a memory in other embodiments of the present invention. This figure includes a number of fuses 630. Each of these fuses are connected between a supply or other current return path, such as ground, and a switch 620. A transistor 610 can be connected to the fuses 630 individually by switches 620.

When a fuse 630 is to be programmed or blown, the corresponding switch 620 connects the transistor 610 to the fuse 630. The transistor 610 is then driven or turned on such that it provides a large current to the fuse 630, thus blowing it. Typically, the transistor 610 is driven or turned on by an assertion of a write enable signal at its gate. In this example, the write enable signal is active low, in other embodiments is may be active high. If a fuse is to be left intact, it is simply not connected to the transistor 610, or if it is connected, then transistor 610 is not driven or turned on.

Once the key is written to the fuse array, the write enable signal path is disabled to prevent modification of the key. For example, the write enable signal to the gate of transistor 610 may be disconnected. Alternately, the circuit that generates the write enable signal may be disabled in some manner such that the write enable signal can no longer be asserted. For example, in this and other embodiments, a supply line, bias point, or other signal may be disabled, disconnected, or otherwise rendered inoperable.

Figure 6B:
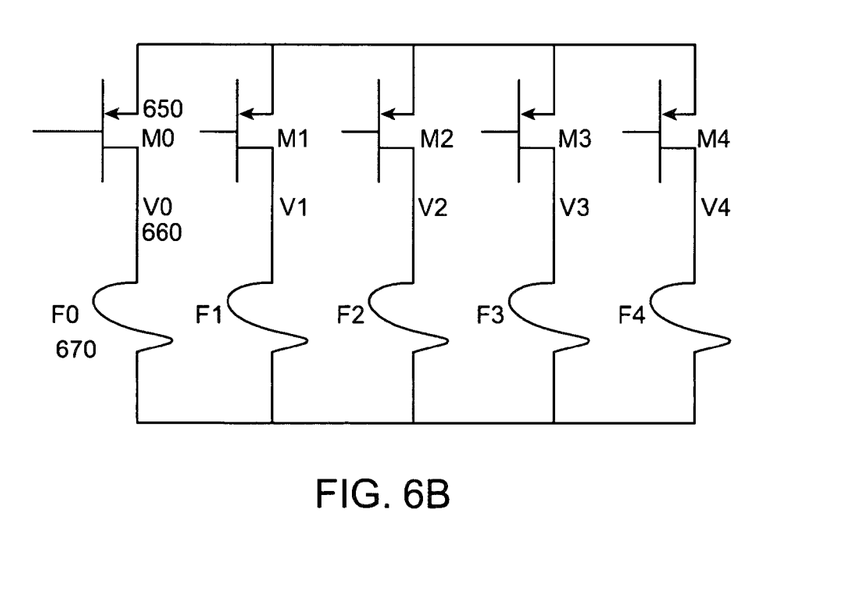
FIG. 6B illustrates the fuse array and circuitry used to read a key from the array.

FIG. 6B illustrates the fuse array and circuitry used to read a key from the fuse array of FIG. 6A. This figure includes a number of transistors 650, each connected to a fuse 670. The fuses may be connected to ground, or other supply or current return line. The transistors 650 are typically small sense devices. When data, such as an encoding key, is to be read from the fuse array, the transistors 650 are driven or turned on. If the corresponding fuse is intact, the voltage 660 at the drain of the transistor 650 stays near the voltage level of the ground or other current return line. If the fuse 670 is blown, the drain of the transistor 650 is near the voltage of its source. In this way, the contents of the fuse array can be determined. It will be appreciated by one skilled in the art that other circuits may be used to program or read a fuse array.

Figure 7:
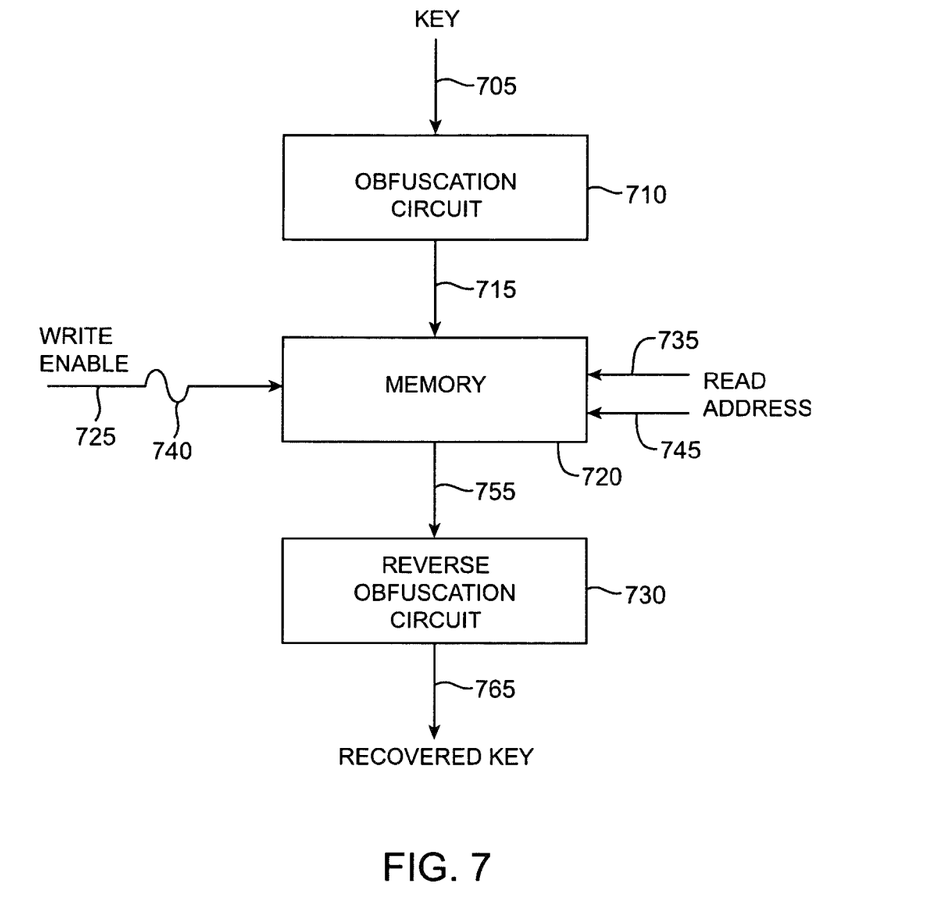
FIG. 7 is a block diagram of a memory and associated circuitry that may be used as the memory in FIG. 5 or as the memory in other embodiments of the present invention.

FIG. 7 is a block diagram of a memory and associated circuitry that may be used as the memory in FIG. 5 or as the memory in other embodiments of the present invention. Included are an obfuscation circuit 710, memory 720, reverse obfuscation circuit 730, and fuse 740.

A key is received on line 705 by the obfuscation circuit 710. The obfuscation circuit obfuscates the key and provides it on lines 715 to the memory 720. The obfuscated key is written to the memory by asserting the write enable signal on line 725. Once the obfuscated key is written to the memory 720, the memory is protected from further writing or erasure by disabling the write enable line 725. In this specific example, this is done by blowing fuse 740 such that the write enable line to the memory can no longer be asserted. At this time, the device is typically sold, for example to an original equipment manufacturer (OEM). In other embodiments, the write enable path may be disabled in a different manner. For example, a bias or supply line to circuitry that generates the write enable signal may be disconnected. One skilled in the art will appreciate the myriad ways in which the write enable signal path may be disabled.

When the device is used in its application, the obfuscated key is read on lines 755 by the reverse obfuscation circuit 730, which provides a recovered key on lines 765. The recovered key may then be used directly, or after further modification, to decode a configuration bitstream.

In this specific example, a read signal on lines 735 is provided to the memory 720. This signal is optional, and not required by an embodiment of the present invention, for example if the memory is only used to store the obfuscated key. Similarly, an address bus 745 is provided to the memory 720. This bus is also optional, and not required by every embodiment of the present invention. Further, in this and other included examples, both obfuscation and reverse or de-obfuscation circuits are included. In other embodiments of the present invention, one or both of these circuits may be omitted.

Figure 8:
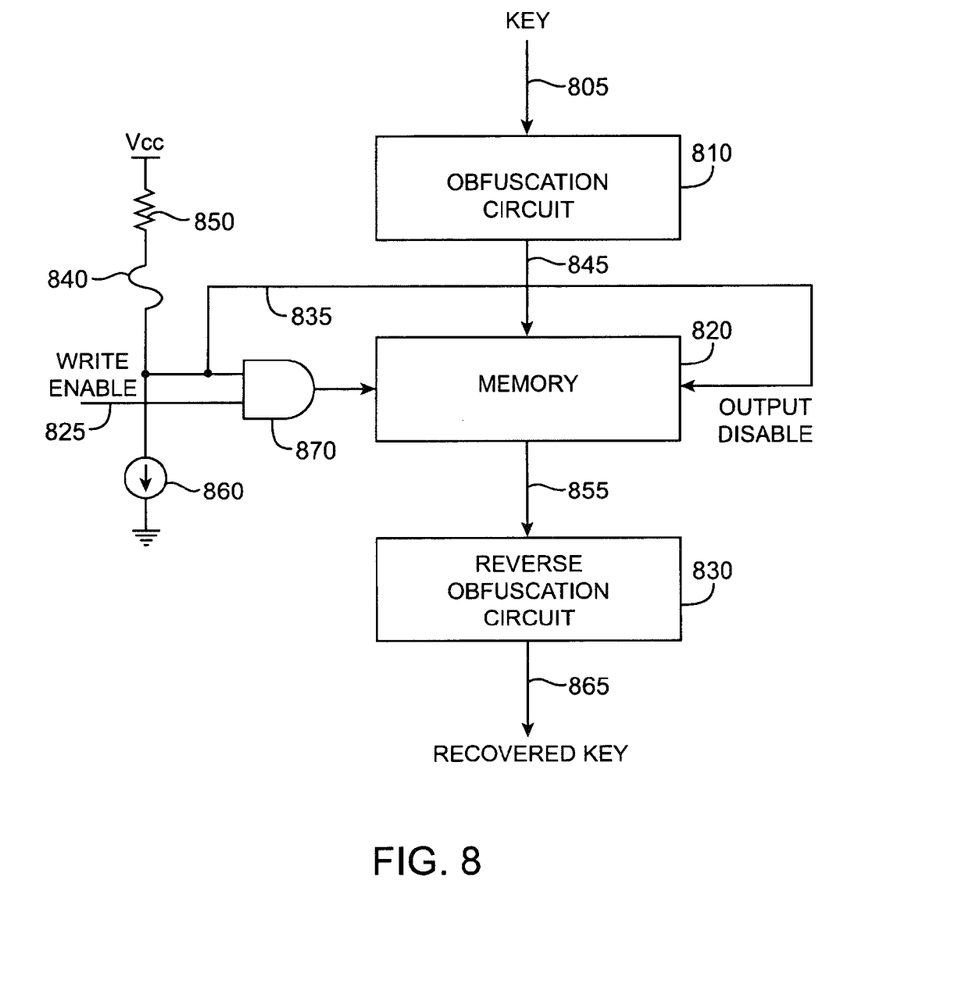
FIG. 8 is a block diagram of another memory and associated circuitry that may be used as the memory in FIG. 5 or as the memory in other embodiments of the present invention.

FIG. 8 is a block diagram of another memory and associated circuitry that may be used as the memory in FIG. 5 or as the memory in other embodiments of the present invention. Included are an obfuscation circuit 810, memory 820, reverse obfuscation circuit 830, and a write enable disconnect circuit including AND gate 870, pull-up resistor 850, fuse 840, and pull-down current source 860. Again, the obfuscation circuit 810 and reverse obfuscation circuit 830 are optional, and either one or both may be omitted in various embodiments of the present invention.

A key is received on line 805 by the obfuscation circuit 810. The obfuscation circuit provides an obfuscated key on line 845 to the memory 820. The obfuscated key is written to the memory 820 by asserting the write enable signal on line 825. The input 835 to AND gate 870 is initially high due to pull-up resistor 850 and fuse 840 providing a lower impedance path than the pull-down current source 860, which may be a small trickle current. Once the obfuscated key is written to the memory, fuse 840 may be blown, for example by a fuse blowing circuit (not shown). At that time, the input 835 to the AND gate 870 is pulled low by the current source 860, thus effectively disconnecting the write enable signal on line 825 from the memory 820.

Once the device is in its application, the obfuscated key may be read from the memory 820 on line 855 by the reverse obfuscation circuit 830. The reverse obfuscation circuit provides a recovered key on lines 865. The recovered key may then be used to decode an encoded configuration bitstream.

In this embodiment, the input 835 to the AND gate 870 senses whether the write enable signal on line 825 is disabled, specifically by sensing the state of fuse 840. The signal on line 835 may then be used to prevent the memory from outputting the key until the write enable signal is permanently disabled. In other embodiments, the disabling of the write enable signal is sensed and used to disable other circuitry, or to prevent the complete functionality of the integrated circuits.

Figure 9:
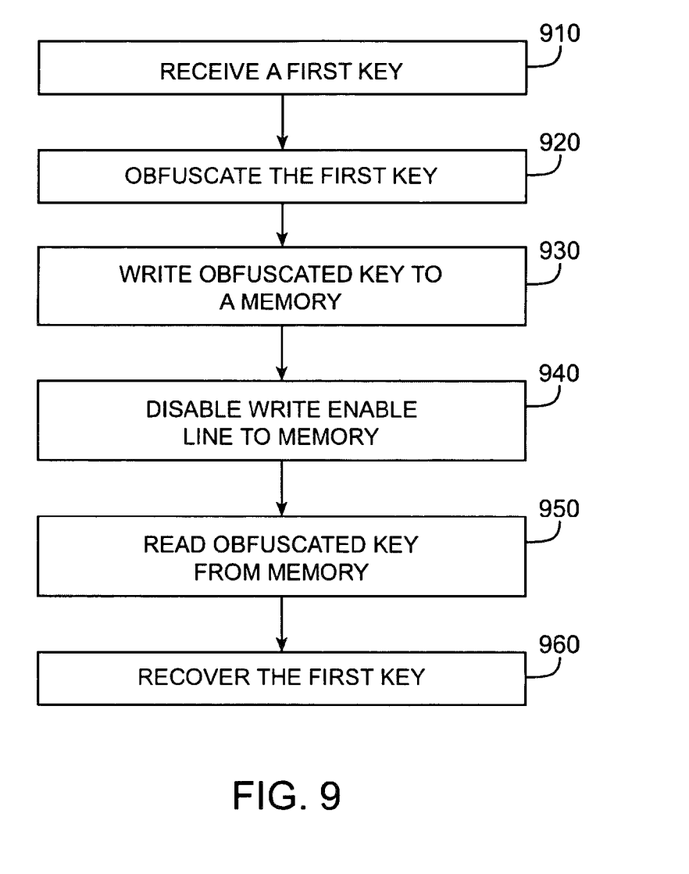
FIG. 9 is a flowchart of a method of converting a memory into a one-time programmable memory consistent with an embodiment of the present invention.

FIG. 9 is a flowchart of a method of converting a memory into a one-time programmable memory consistent with an embodiment of the present invention. In act 910, a first key is received. The first key is obfuscated in act 920. In act 930, the obfuscated key is written to the memory. The obfuscated key is written to the memory by asserting a write enable or similar line. In act 940, the write enable signal path is disabled or disconnected from the memory. Again, at this point the device is typically deployed in a system or other application.

When the device is to be configured, the obfuscated key is read from memory, in act 950. In act 960, the first key is recovered from the obfuscated key. Again, in a typical embodiment of the present invention, acts 910 through 940 are performed by an integrated circuit manufacturer, while acts 950 and 960 typically occur once the device is in use in its application.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An integrated circuit comprising:
an obfuscation circuit;
a memory coupled to the obfuscation circuit;
a reverse obfuscation circuit coupled to the memory;
a first circuit coupled to the memory;
a write enable line coupling the first circuit to the memory;
a second circuit coupled to the first circuit, wherein the second circuit is configured to disable the first circuit after a key is written to the memory; and
a third circuit configured to:
prevent the memory from outputting the key written to the memory when the first circuit is enabled; and
allow the memory to output the key written to the memory when the first circuit is disabled.

2. The integrated circuit of claim 1 wherein the memory is selected from the group consisting of Flash, electrically erasable programmable read-only memory, erasable programmable read-only memory, dynamic random-access memory, and a static random-access memory.

3. The integrated circuit of claim 1 wherein the memory comprises a one time programmable element.

4. The integrated circuit of claim 1 wherein the second circuit comprises a programmable connection.

5. The integrated circuit of claim 1 further comprising:
a decoding circuit coupled to the reverse obfuscation circuit,
wherein the decoding circuit receives a recovered key, and uses the recovered key to decode an encoded configuration bitstream.

6. The integrated circuit of claim 1 wherein the integrated circuit is a field programmable gate array.

7. A method comprising:
writing a key to a memory, wherein:
a first circuitry is coupled to the memory by a write enable line, and
the first circuitry is enabled during the writing of the key to the memory;
preventing the memory from outputting the key written to the memory when the first circuitry is enabled;
allowing the memory to output the key written to the memory when the first circuitry is disabled; and
disabling the first circuitry using second circuitry after the key is written to the memory.

8. The method of claim 7 further comprising:
obfuscating the key with obfuscation circuitry prior to the writing of the key to the memory;
reading the key from the memory; and
recovering the key read from the memory with reverse obfuscation circuitry.

9. The method of claim 7 wherein the memory is selected from the group consisting of Flash, electrically erasable programmable read-only memory, erasable programmable read-only memory, dynamic random-access memory, and a static random-access memory.

10. The integrated circuit of claim 7 wherein the memory comprises a one time programmable element.

11. The integrated circuit of claim 7 wherein the first circuitry comprises a programmable connection.

12. The integrated circuit of claim 8 further comprising:
using the recovered key to decode an encoded configuration bitstream.

13. The method of claim 7, wherein the first circuitry and the second circuitry are implemented on a field programmable gate array.

14. An integrated circuit comprising:
a memory;
input circuitry configured to write a key to the memory;
first circuitry coupled to the memory by a write enable line, wherein the first circuitry is enabled during the writing of the key to the memory;
control circuitry configured to:
prevent the memory from outputting the key written to the memory when the first circuitry is enabled; and
allow the memory to output the key written to the memory when the first circuitry is disabled; and
second circuitry coupled to the first circuitry, wherein the first circuitry is configured to disable the first circuitry using after the key is written to the memory.

15. The integrated circuit of claim 14 further comprising:
obfuscation circuitry configured to obfuscate the key with prior to the writing of the key to the memory;
output circuitry configured to read the key from the memory; and
reverse obfuscation circuitry configured to recover the key read from the memory.

16. The integrated circuit of claim 14 wherein the memory is selected from the group consisting of Flash, electrically erasable programmable read-only memory, erasable programmable read-only memory, dynamic random-access memory, and a static random-access memory.

17. The integrated circuit of claim 14 wherein the memory comprises a one time programmable element.

18. The integrated circuit of claim 14 wherein the second circuit comprises a programmable connection.

19. The integrated circuit of claim 15 further comprising:
a decoding circuit coupled to the reverse obfuscation circuit,
wherein the decoding circuit receives a recovered key, and uses the recovered key to decode an encoded configuration bitstream.

20. The integrated circuit of claim 14 wherein the integrated circuit is a field programmable gate array.

* * * * *